(12) United States Patent
Bullman

(10) Patent No.: US 6,754,186 B1
(45) Date of Patent: Jun. 22, 2004

(54) DSL ACTIVE MODEM DETECTION

(75) Inventor: William R Bullman, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/506,095

(22) Filed: Feb. 17, 2000

Related U.S. Application Data

(60) Provisional application No. 60/150,975, filed on Aug. 27, 1999.

(51) Int. Cl.[7] ................................................ H04B 1/44
(52) U.S. Cl. ...................... 370/282; 370/420; 370/447; 370/463; 375/222
(58) Field of Search .......................... 370/282, 286, 370/289, 290, 292, 293, 445, 447, 448, 450, 451, 401, 402, 419, 420, 421, 461, 462, 463; 375/219, 220, 222; 379/406.01, 32.01, 32.04

(56) References Cited

U.S. PATENT DOCUMENTS

| | | | | |
|---|---|---|---|---|
| 4,766,591 A | * | 8/1988 | Huang | 370/445 |
| 5,557,612 A | * | 9/1996 | Bingham | 370/449 |
| 5,896,443 A | * | 4/1999 | Dichter | 379/93.08 |
| 5,917,809 A | * | 6/1999 | Ribner et al. | 370/286 |
| 6,052,380 A | * | 4/2000 | Bell | 370/445 |
| 6,075,795 A | * | 6/2000 | Barsoum et al. | 370/445 |
| 6,169,744 B1 | * | 1/2001 | Grabelsky et al. | 370/447 |
| 6,236,675 B1 | * | 5/2001 | Bedingfield et al. | 375/222 |

OTHER PUBLICATIONS

DSL Simulation Techniques and Standards Development for Digital Subscriber Line Systems, by Dr. Walter Y. Chen, 1998 by MacMillan Technical Publishing, pp. 443–444.

Standards Project for Interfaces Relating to Carrier to Customer Connection of Asymmetrical Digital Subscriber Line (ADSL) Equipment, by John Bingham, Amati Communications, San Joe, CA and Frank Van der Putten, Alcatel Telecom, dated Jun. 1, 1998, pp. 1–269.

* cited by examiner

Primary Examiner—Frank Duong
(74) Attorney, Agent, or Firm—Steve Mendelsohn

(57) ABSTRACT

A discrete multi-tone communication system having a selected remote end terminal that senses data transmission activity on the discrete multi-tone communication channel. The selected remote end terminal transmits data when no data transmission activity is sensed. The discrete multi-tone system allows a plurality of remote end terminals to be connected together at a node that in turn is connected to the central office.

31 Claims, 4 Drawing Sheets

DSL ACTIVE MODEM DETECTION

REFERENCE TO RELATED APPLICATIONS

This application claims the benefit of U.S. Provisional Application No. 60/150,975, filed Aug. 27, 1999.

FIELD OF THE INVENTION

This invention relates to discrete multi-tone (hereinafter "DMT") communication systems. Particularly, the invention concerns improved apparatus and methods for controlling data transmissions on discrete multi-tone communication systems.

BACKGROUND OF THE INVENTION

Discrete multi-tone communication systems transmit information encoded in multiple tones, where each tone corresponds to a modulated carrier signal having a different frequency. For instance, a full-rate DMT system conforming to the ITU G.922.1 (also known as G.dmt) standard use 255 different tones corresponding to a bandwidth of 1.104 MHz. Other DMT systems, referred to as half-rate DMT systems, conform to the ITU G.992.2 (also known as G.lite) standard and use 127 different tones corresponding to a bandwidth of 0.552 MHz. A DMT system can be viewed as a group of multiple voice band modems (256 modems in the case of full-rate DMT) with their carrier frequencies ranging from a few kHz to near 1 MHz.

In typical distributed DMT systems based on either the G.dmt or the G.lite standard, tones #1–31 are reserved for upstream transmissions from the client (e.g. consumer personal equipment) to the Central Office (hereinafter "CO"). The remaining tones (i.e. tones #32–255 for G.dmt) are reserved for downstream transmissions from the CO to the client. If echo cancellation is supported at both the Central Office and the client, then the DMT system can operate in an overlapped spectrum mode where tones #1–31 are used for both upstream and downstream transmissions.

At the beginning of each connection, certain initialization operations (e.g. transceiver training, channel analysis, message exchange, and bit loading) are performed so that each connection between Client and Central Office can identify which of the tones are available for transmission during the datamode transmissions (i.e. non-initialization transmissions). After initialization, the DMT system can begin transmitting data.

Known DMT systems can also include a pilot tone to aid in timing recovery during the initialization phase of the DMT system. A pilot tone can be implemented by using a subcarrier dedicated only to timing recovery. In particular, the DMT system can provide for transmission of a pilot tone at one DMT transceiver, called the clock source, and the DMT system can provide for receipt of the pilot tone at another end of the DMT transceiver, called the clock recipient. By comparing the pilot tone with the clock at the clock recipient the DMT system can be synchronized.

DMT systems can be implemented by connecting a DMT transceiver with a Central Office through a twisted-pair telephone loop typically used to connect Plain Old Telephone Systems (hereinafter "POTS"). DMT systems can be designed to coexist with a POTS service on the same twisted-pair cable. A Frequency Division Multiplex scheme is necessary to separate the voice channel for POTS from the spectrum occupied by a DMT system, such as in a Digital Subscriber Line (hereinafter "DSL"). Thus, communication systems are known that connect a POTS service with a DMT system on the same twisted-pair cable, however, systems connecting two DMT transceivers to the Central Office on the same twisted-pair cable are not known.

Connecting two or more DMT transceivers to the Central Office on the same twisted-pair cable may prove advantageous in locations already wired for POTS, such as existing homes. Currently, if two DMT transceivers were connected to the Central Office on the same twisted-pair cable, the interference between the two DMT signals would disrupt communication with the Central Office.

Accordingly, there exists a need for a DMT communication system capable of connecting two DMT transceivers to the Central Office on the same cable.

SUMMARY OF THE INVENTION

A selected remote end terminal chosen from a plurality of remote end terminals in a DMT system may be connected to a Central Office, according to the invention, by sensing data transmission activity and by transmitting data from the selected remote end terminal when no data transmission activity is sensed. The plurality of remote end terminals may be connected together at a node, and the node can be connected to the Central Office through a cable, such as a telephone wire. The selected remote end terminal senses data transmission activity between the Central office and another of the plurality of remote end terminals connected to the node. The selected remote end terminal then transmits data when no data transmission activity is sensed between the Central Office and another of the plurality of remote end terminals.

In another aspect of the invention, a DMT system includes a selected remote end terminal connected to a Central Office, the selected remote end terminal including a discrete multi-tone transceiver and a controller for controlling the transmission of data from the discrete multi-tone transceiver. The discrete multi-tone transceiver receives data from the Central Office and the discrete multi-tone transceiver transmits data to the Central Office over cable, such as a telephone wire. The controller controls the transmission of data from the discrete multi-tone transceiver in response to data transmission activity between the Central Office and another remote end terminal.

BRIEF DESCRIPTION OF THE DRAWINGS

The features and advantages of the invention will be apparent from the following description, as illustrated in the accompanying Figures in which like reference characters refer to the same elements throughout the different views.

DETAILED DESCRIPTION

Figure 1:
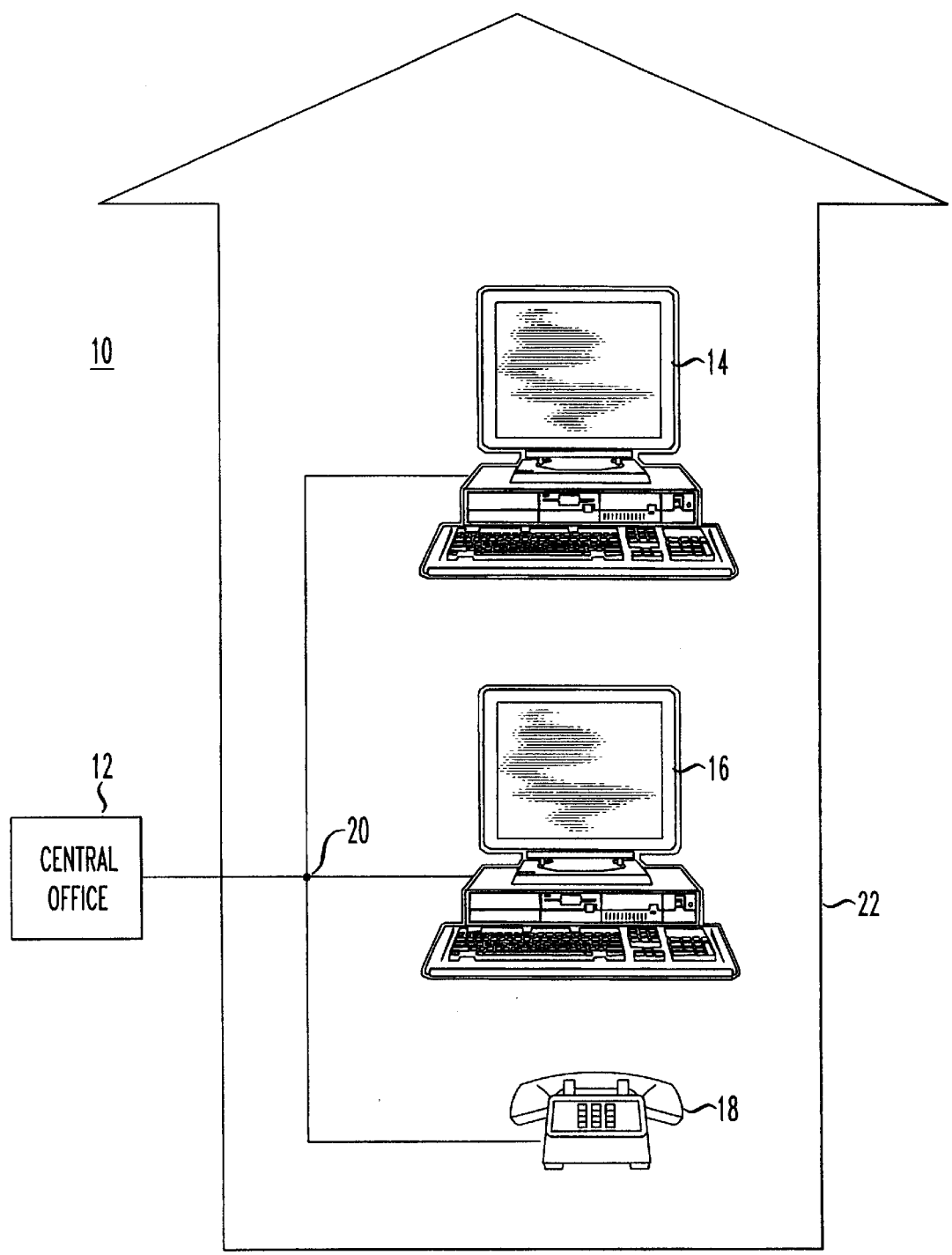
FIG. 1 is an illustration of a DMT system in accordance with the invention.
Figure 2:
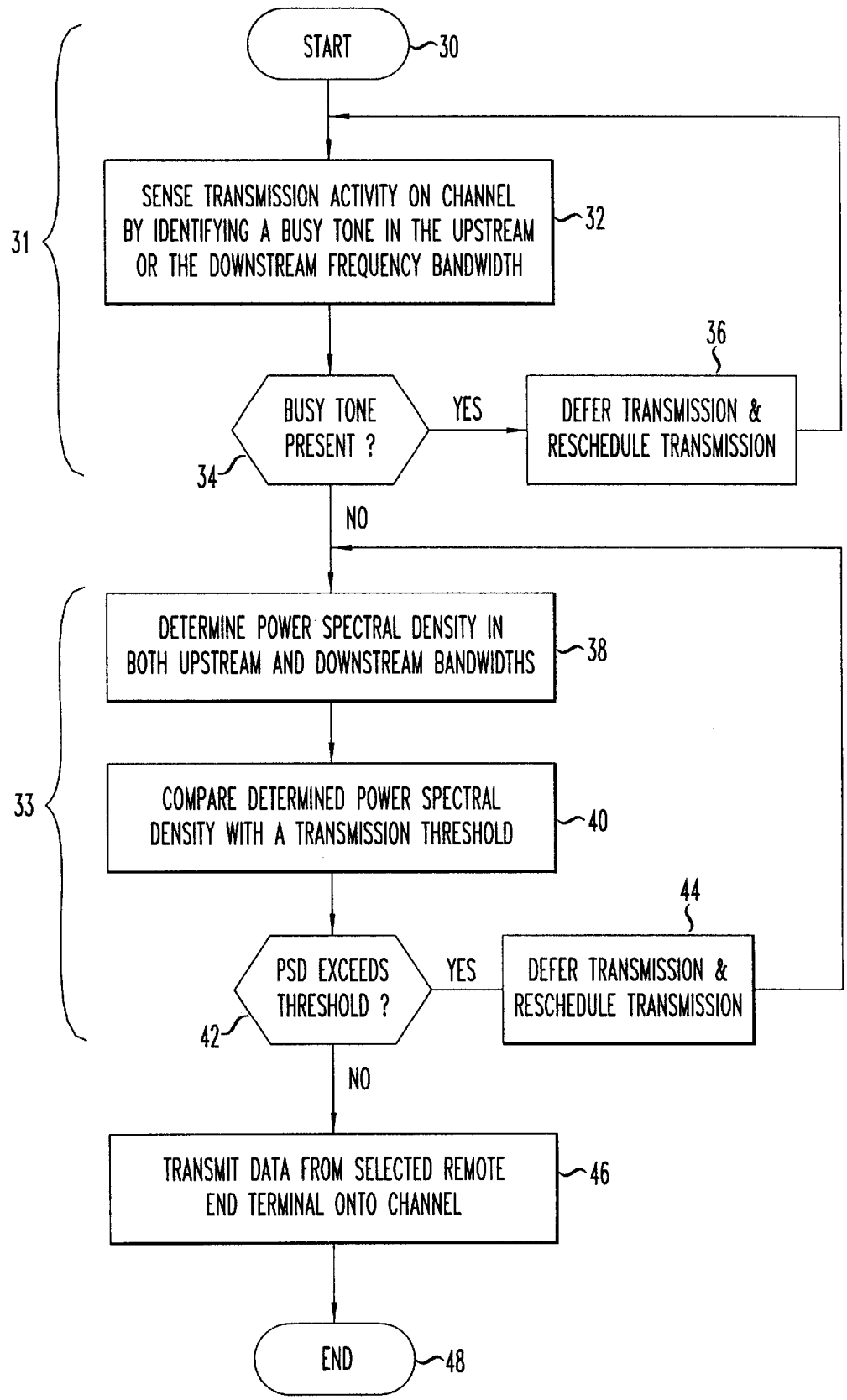
FIG. 2 is a flow chart for transmitting data from a remote end terminal in the DMT system of FIG. 1.

FIG. 1 illustrates a DMT system 10 having a plurality of remote end terminals 14 and 16 connected together at node 20. FIG. 1 further shows that a Central Office 12 can be connected to the remote end terminals 14, 16 through the node 20. The CO 12 is typically connected to node 20 through a cable, such as a twisted-pair telephone wire. FIG. 2 is a flow chart showing the method of transmitting data from the selected remote end terminal 14. In particular, remote end terminal 14 senses data transmission activity between the CO 12 and another remote end terminal (e.g. terminal 16) connected to the node 20. Remote end terminal 14 also transmits data when no data transmission activity is detected between the CO 12 and the remote end terminal 16.

With further reference to FIG. 1, a telephone 18 is shown connected to node 20. In accordance with the invention, the remote end terminals 14, 16 and the telephone 18 can all be connected together at node 20 without interfering with the data transmissions of each other. Generally speaking, remote end terminals 14 and 16 only transmit data onto the communication channel when the channel is inactive. Each remote end terminal in the DMT system 10 can sense if the channel is being utilized by another remote end terminal; if the channel is being utilized then transmission is deferred. As described below with reference to FIG. 3, the telephone does not interfere with the remote end terminals because POTS operates in a frequency band distinct from that utilized by the remote end terminals 14, 16.

FIG. 2 is a flow chart for transmitting data from a remote end terminal 14 in the DMT system of FIG. 1. The flow chart includes a first group of steps 31 that can be interchanged with a second group of steps 33. The first group of steps 31 includes the steps 32, 34 and 36. The second group of steps 33 includes the steps 38, 40, 42 and 44. The first group of steps 31 determines whether transmission activity is occurring between the CO 12 and another remote end terminal 16 by monitoring a busy tone signal. The second group of steps 33 determines whether transmission activity is occurring between the CO 12 and another remote end terminal 16 by monitoring the power spectral density on the communication channel. In accordance with the invention, the selected remote end terminal 14 can sense data transmission activity between the CO and another remote end terminal by either: monitoring the busy tone as in the first group of steps 31; monitoring the power spectral density as in the second group of steps 33; or monitoring both the busy tone and the power spectral density.

At step 32 the selected remote end terminal 14 senses transmission activity by identifying whether a busy tone is present in the upstream bandwidth or whether a busy tone is present in the downstream bandwidth. The selected remote end terminal can identify whether a busy tone is present by comparing the signal of a preselected tone, called the busy tone, with a busy tone threshold. At step 34, the remote terminal 14 makes a decisions based upon whether a busy tone was detected. If a busy tone is not detected then processing continues to step 38. If a busy tone is detected then processing proceeds to step 36.

At step 36, a busy tone has indicated that the channel is currently being used. Accordingly, at step 36 transmission by the selected remote end terminal 14 is deferred and rescheduled. The data from the selected remote end terminal can be re-transmitted after a randomly determined wait period. After step 36, processing returns to step 32.

At step 38, the remote end terminal 14 determines the power spectral density in both the upstream and the downstream frequency bands, according to techniques well known in the art. At step 40, the remote end terminal 14 compares the determined power spectral density with a transmission threshold. The transmission threshold has a value indicative of activity on the channel between the CO 12 and the node 20. If the determined power spectral density is less than the threshold then only noise is present on the channel, if the power spectral density is greater than the threshold then the channel is being used.

At step 42, the remote end terminal determines how to proceed based upon whether the determined power spectral density exceeds the threshold. If the power spectral density is less than the threshold then processing proceeds to step 46. If the power spectral density is greater than the threshold then processing proceeds to step 44.

At step 44, the level of the power spectral density has indicated that the channel is currently being used. Accordingly, at step 44 transmission by the selected remote end terminal 14 is deferred and rescheduled. The data can be re-transmitted after a randomly determined wait period. After step 44, processing returns to step 38.

At step 46, the selected remote end terminal 14 transmits data to the Central Office 12 because the channel is currently not being used. After step 46, processing proceeds to step 48 where the process ends.

Figure 3:
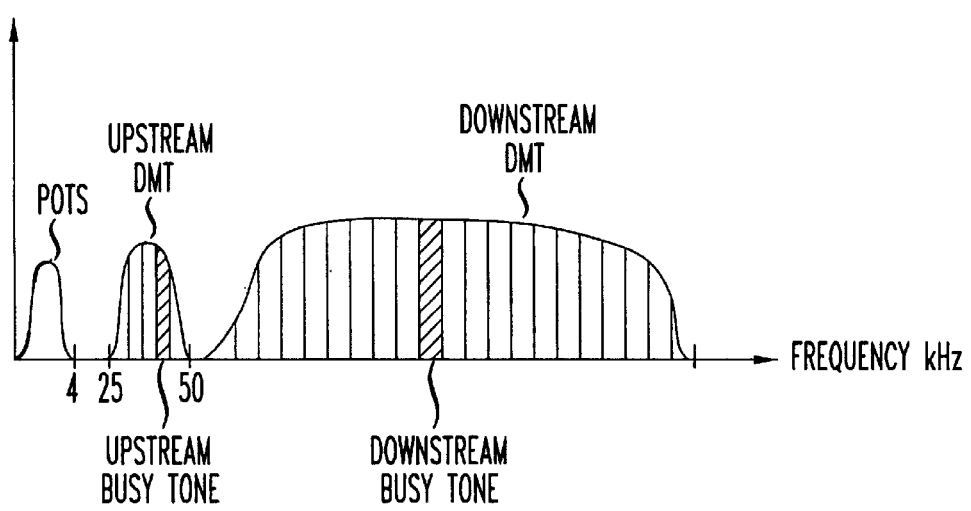
FIG. 3 is an exemplary graph of frequency spectrum usage in the DMT system of FIG. 1.

FIG. 3 is an exemplary graph of frequency spectrum usage in the DMT system 10 of FIG. 1. Frequency is plotted along the X-axis of FIG. 3. As illustrated, POTS communication utilizes the frequency band less than 4 kHz, the upstream channel for the DMT system occupies the frequency band from 25–50 kHz, and the downstream channel for the DMT system occupies the frequency band from 50–1104 kHz. The illustrated frequencies bands are merely intended to be one possible exemplary division of the frequency space from among an infinite number of potential divisions of the frequency space.

An Upstream Busy Tone is identified in the upstream DMT channel, and a Downstream Busy Tone is identified in the downstream DMT channel. The frequency bands for the Upstream and Downstream Busy Tone can be utilized to identify channel usage between a remote end terminal and the CO 12. For instance, when a remote end terminal has successfully obtained control of the channel it would transmit a Busy Tone in the Upstream Busy Tone frequency band whenever it transmits over the channel. In an analogous fashion, the CO would transmit a Busy Tone in the Downstream Busy Tone frequency band whenever it transmits over the channel. Thus, a signal transmitted in the Busy Tone frequency bands can be used to alert other remote end terminals that the channel is currently being used.

Figure 4:
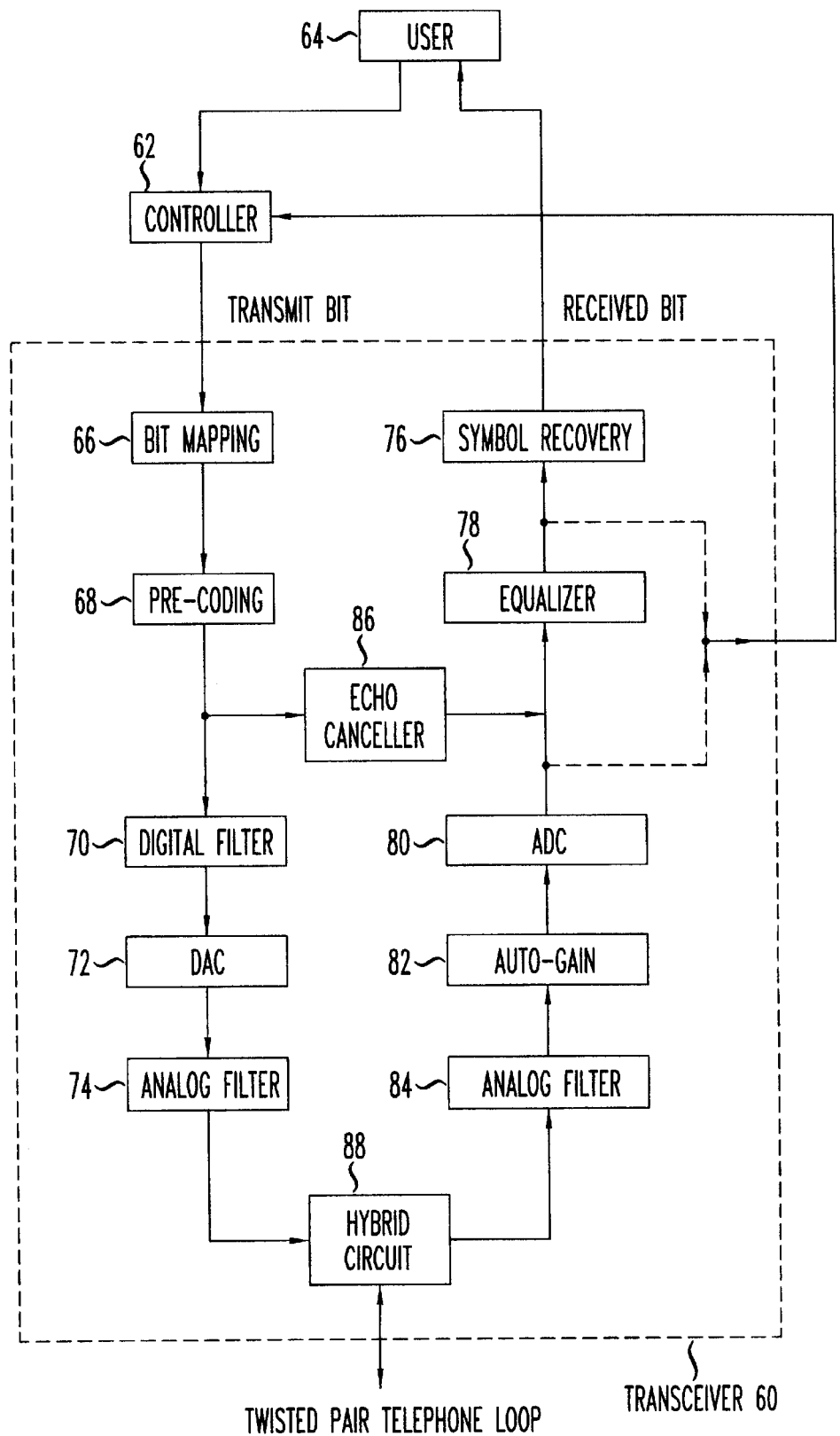
FIG. 4 is a detailed block diagram of the remote end terminal illustrated in FIG. 1.

FIG. 4 is a detailed block diagram of the remote end terminal 14 illustrated in FIG. 1. The remote end terminal 14 includes a discrete multi-tone transceiver 60, a controller 62, and a user 64. The transceiver 60 receives data from and transmits data to the CO 12 over a cable, such as a twisted-pair telephone loop. The controller 62 controls the transmission of data from the transceiver 60 in response to transmission activity between the CO 12 and another remote end terminal 16. User 64 represents a host device connected to the transceiver and the controller, a representative host device is a personal computer.

The transceiver 60 includes a hybrid circuit 88 for coupling the selected remote end terminal to the CO. The hybrid circuit enables full duplex transmission between the remote end terminal and the CO. In full-duplex systems one or more terminals may transmit and receive simultaneously. The dual communications channel may in fact be multiple wires or cable, or a single wire or cable that simultaneously carries transmit and receive signals in both directions, perhaps using frequency division.

The hybrid circuit is basically an electrical bridge wherein only a little signal from the transmit path returns to the receiving path when the electrical bridge is balanced. The hybrid circuit 88 is typically an analog circuit and accordingly is connected to the rest of the transceiver through the Analog to Digital converter 80 and Digital to Analog converter 72. Examples and further details on hybrid circuits can be found in *DSL Simulation Techniques and Standards Development for Digital Subscriber Line Systems,* by Walter Y. Chen, Macmillan Technology Series, 1998, the contents of which are incorporated herein by reference.

The transceiver 60 also includes a transmit path and a receive path. The transmit path includes: a pre-coder 68, a bit mapper 66, a digital filter 70, a Digital to Analog Converter (hereinafter "DAC") 72, and an Analog Filter 74. The receive path includes: a symbol recover table 76, an equalizer 78, an Analog to Digital Converter (hereinafter "ADC") 80, an Auto-Gain 82, and an Analog Filter 84. The hybrid is operably coupled to both the transmit path and the receive path.

In the transmit path, the pre-coder 66 and the bit mapper 68 place the data in the proper format for transmission. For instance, the pre-coder 66 can include functional blocks for performing a cyclic redundancy coding, data scrambling, forward error correction, or constellation encoding. The digital filter 70 can include functions for converting the time based signal from the user into a frequency based signal (i.e. inverse discrete fourier transform) and/or the filter 70 can be used to smooth the incoming data. The DAC 72 converts the digital signal to an analog signal, and the analog filter 74 smooths the analog signal prior to transmission by the hybrid 88.

In the receive path, the analog filter 84 smoothes the received signal from the hybrid 88. The auto-gain 82 adjusts the gain of the incoming signal, and the ADC converts the incoming signal from an analog signal to a digital signal. The equalizer 78 minimizes the effects of channel distortion. Theoretically, the equalizer 78 has a frequency response that is the inverse of the communication channel. In practice, the equalizer 78 is normally implemented with a digital adaptive filter. The equalizer is typically followed by a Symbol Recovery table 76. The symbol recovery table is used to recover the transmitted data from the format in which it was transmitted.

The transceiver also includes an echo canceller 86. The echo canceller receives an input signal from the output of the pre-coder 68, and the echo canceller generates an output signal that is received by the equalizer 78. The echo canceller reduces the magnitude of the transmitted signal (i.e. the echo) found in the received signal path of the transceiver 60.

The echo for DMT systems typically occurs at the hybrid circuit 88 where the transmit and the receiving path are jointed together. To maintain a low residual echo level compared with the weak received signal, the echo cancellation level can be as high as 60 dB.

The echo canceller needs be in parallel with the echo path, i.e. the hybrid circuit 88. The echo canceller synthesizes the echo path including the Digital filter, DAC, the transmitting Analog filter, hybrid circuit, the receiving analog filter, the auto-gain, and the ADC. The echo canceller can produce an echo replica with the same transmitting data, but with reversed sign to cancel the real echo. Examples and further details on echo cancellers can be found in *DSL Simulation Techniques and Standards Development for Digital Subscriber Line Systems,* by Walter Y. Chen, Macmillan Technology Series, 1998, the contents of which are incorporated herein by reference.

Controller 62 of FIG. 4 is operably coupled to the user 64, the equalizer 78 and the receive path in the transceiver 60. The controller 62 controls the transmission of data from the transceiver 60 in response to data transmission sensed on the communication channel. If the controller 62 senses data transmission on the channel, then the controller delays transmission of the data from the selected remote end terminal. If the controller senses that the channel is empty of data transmission, then the controller allows the selected remote end terminal to transmit. The controller can be implemented using electronic hardware, or software instructions, or a combination of hardware and software.

The transceiver 60 uses the receive path to monitor activity on the communication channel to which it is connected. The data transmitted on the communication channel is received, filtered, and converted to a digital signal at the equalizer 78. The data at the input of the equalizer 78 or the data at the output of the equalizer 78 can be used by the controller to identify activity on the communication channel. The controller 60 can be operably coupled to either the input or the output of the equalizer 78.

In one aspect of the invention, the controller 62 identifies whether the busy tone is present in the upstream or downstream frequency bands by analyzing the data received from the input or output of the equalizer 78. The controller identifies a busy tone by comparing the signal level found in a preselected discrete frequency tone, called the busy tone, with a threshold level. If the controller determines that the signal level at the busy tone exceeds the threshold level, then the controller decides that the channel is being used.

In another aspect of the invention, the controller 62 identifies whether the communication channel is being used by another remote end terminal by analyzing the power spectral density in the upstream or downstream frequency bands. The controller obtains the signal in the upstream and downstream frequency bands from the input or the output of the equalizer 78. The controller 62 then determines the power spectral density of the signal in the upstream frequency bands and the power spectral density of the signal in the downstream frequency bands using techniques known in the art. Afterwards, the controller 62 compares the power spectral density of the signals with a selected threshold. If the controller determines that the power spectral density in either the upstream or downstream frequency bands exceeds the threshold level, then the controller decides that the channel is being used.

The controller 62 also includes functionality for deferring data transmission from the selected remote end terminal 14. The controller will typically defer transmission from the selected remote end terminal 14 if the controller has determined that the communication channel between the CO 12 and another remote end terminal 16 is being used. Other features of the invention provide for a controller 62 that can reschedule data transmission from the remote end terminal 14. Typically, the transmission from the remote end terminal 14 is scheduled to occur after a randomly determined wait period.

While the invention has been shown and described having reference to specific preferred embodiments, those skilled in the art will recognize that variation in form and detail may be made without departing from the spirit and scope of the invention. Thus, specific details of the disclosure herein are not intended to be necessary limitations on the scope of the invention other than as required by the prior art.

I claim:

1. In a discrete multi-tone communication system having a plurality of remote end terminals connected together at a node and having a central office connected to the node through a telephone wire, a method of transmitting data from a selected remote end terminal, comprising:

sensing data transmission activity between the central office and another of the plurality of remote end terminals connected to the node with a controller of the selected remote end terminal operatively coupled to an equalizer in a receive path of the selected remote end terminal to sense the data transmission activity, and transmitting data from the selected remote end terminal when no data transmission activity is sensed.

2. The method of claim 1, wherein the sensing step includes the steps of:

identifying whether a downstream busy tone is present in data transmissions from the central office, and identifying whether an upstream busy tone is present in data transmissions to the central office.

3. The method of claim 2, wherein identifying the downstream busy tone includes the step of detecting a tone in a specified discrete frequency band in a specified downstream frequency bandwidth.

4. The method of claim 3, wherein the detecting downstream tone step further includes the step of comparing the detected tone against a busy tone threshold.

5. The method of claim 2, wherein identifying the upstream busy tone includes the step of detecting a tone in a specified discrete frequency band in a specified upstream frequency bandwidth.

6. The method of claim 5, wherein the detecting upstream tone step further includes the step of comparing the detected tone against a busy tone threshold.

7. The method of claim 1, wherein the sensing step includes the steps of:

determining the power spectral density in a selected bandwidth, and comparing the determined power spectral density with a transmission threshold.

8. The method of claim 1, wherein the sensing step includes the step of sensing transmission activity during the initialization phase of connectivity between the central office and another of the plurality of remote end terminals by identifying whether a busy tone is present in a specified discrete frequency band.

9. The method of claim 8, wherein the sensing step further includes the step of sensing transmission activity during the data transmission phase of connectivity between the central office and another of the plurality of remote end terminals by determining the power spectral density in a selected bandwidth of the transmissions between the central office and another of the plurality of remote end terminals.

10. The method of claim 1, further comprising the step of deferring data transmission from the selected remote end terminal when data transmission activity is sensed.

11. The method of claim 10, further including the step of rescheduling data transmission from the selected remote end terminal.

12. The method of claim 11, wherein data is re-transmitted after a randomly determining a wait period.

13. The method of claim 1, wherein the controller is adaptively coupled to an input of the equalizer.

14. The method of claim 1, wherein the controller is adaptively coupled to an output of the equalizer.

15. In a discrete multi-tone communication system having a selected remote end terminal connected to a central office, the selected remote end terminal comprising:

a discrete multi-tone transceiver adapted to receive data from and transmit data to the central office over the telephone wire, and a controller adapted to control the transmission of data from the discrete multi-tone transceiver in response to sensing data transmission activity between the central office and another remote end terminal, wherein the controller is operatively coupled to an equalizer in a receive path of the discrete multi-tone transceiver to sense the data transmission activity.

16. The selected remote end terminal according to claim 15, wherein the discrete multi-tone transceiver further comprises a hybrid circuit adapted to couple the selected remote end terminal to the central office, the hybrid circuit enabling full duplex data transmission.

17. The selected remote end terminal according to claim 16, wherein the discrete multi-tone transceiver further comprises a transmit path and the receive path coupled to the hybrid circuit.

18. The selected remote end terminal according to claim 17, wherein the transmit path further includes:

a digital-to-analog converter adapted to map a digital data stream to an analog data stream, and an analog filter coupled between the digital-to-analog converter and the hybrid circuit, adapted to shape the analog data stream.

19. The selected remote end terminal according to claim 17, wherein the receive path further includes:

an analog filter adapted to shape a received analog data stream from the hybrid circuit, an analog-to-digital converter coupled to the analog filter adapted to map the shaping analog data stream into a digital data stream, and an equalizer adapted to minimize the effect of channel distortion on the received analog data stream.

20. The selected remote end terminal according to claim 17, wherein the discrete multi-tone transceiver further comprises an echo canceller to reduce interference between the transmit path and the receive path.

21. The selected remote end terminal according to claim 15, wherein the controller is adapted to defer data transmission from the selected remote end terminal when data transmission activity is sensed.

22. The selected remote end terminal according to claim 21, wherein the controller is adapted to reschedule data transmission from the selected remote end terminal.

23. The selected remote end terminal of claim 15, wherein the controller is adaptively coupled to an input of the equalizer.

24. The selected remote end terminal according to claim 15, wherein the controller is adapted to identify a busy tone in a specified frequency band.

25. The selected remote end terminal according to claim 15, wherein the controller is adapted to:

determine the power spectral density in a selected bandwidth, and compare the determined power spectral density with a transmission threshold.

26. The selected remote end terminal of claim 15, wherein the controller is adaptively coupled to an output of the equalizer.

27. In a full duplex communication system having a plurality of remote end terminals connected together at a node and having a central office connected to the node through a telephone wire, a method of transmitting data from a selected remote end terminal, comprising:

sensing data transmission activity between the central office and another of the plurality of remote end terminals connected to the node with a controller of the selected remote end terminal operatively coupled to an equalizer in a receive path of the selected remote end terminal to sense the data transmission activity, and transmitting data from the selected remote end terminal when no data transmission activity is sensed.

28. The method of claim 27, wherein the controller is adaptively coupled to an input of the equalizer.

29. The method of claim 27, wherein the controller is adaptively coupled to an output of the equalizer.

30. In a discrete multi-tone communication system having a selected remote end terminal connected to a central office, the selected remote end terminal comprising:

a discrete multi-tone transceiver adapted to receive data from and transmit data to the central office over the telephone wire, and a controller adapted to control the transmission of data from the discrete multi-tone transceiver in response to data transmission activity between the central office and another remote end terminal, wherein:

the discrete multi-tone transceiver further comprises:

a hybrid circuit adapted to couple the selected remote end terminal to the central office, the hybrid circuit enabling full duplex data transmission; and a transmit path and a receive path coupled to the hybrid circuit, wherein the receive path further includes:

an analog filter adapted to shape a received analog data stream from the hybrid circuit, an analog-to-digital converter coupled to the analog filter adapted to map the shaping analog data stream into a digital data stream, and an equalizer adapted to minimize the effect of channel distortion on the received analog data stream; and the controller is operably coupled to the equalizer such that the controller can sense data transmission activity between the central office and another remote end terminal.

31. In a discrete multi-tone communication system having a selected remote end terminal connected to a central office, the selected remote end terminal comprising:

a discrete multi-tone transceiver adapted to receive data from and transmit data to the central office over the telephone wire, and a controller adapted to control the transmission of data from the discrete multi-tone transceiver in response to data transmission activity between the central office and another remote end terminal, wherein the discrete multi-tone transceiver includes a transmit path and a receive path and wherein the controller is operably coupled to the receive path such that the controller can sense data transmission activity between the central office and another remote end terminal.

* * * * *